US012698993B2

(12) United States Patent
Vogt et al.

(10) Patent No.: US 12,698,993 B2
(45) Date of Patent: Aug. 4, 2026

(54) ULTRASONIC FLOWMETER AND METHOD FOR OPERATING AN ULTRASONIC FLOWMETER

(71) Applicant: KROHNE Messtechnik GmbH, Duisburg (DE)

(72) Inventors: Michael Vogt, Bochum (DE); Cornelis Johannes Hogendoorn, BG Spijk (NL)

(73) Assignee: Krohne Messtechnik GmbH, Duisburg (DE)

( * ) Notice: Subject to any disclaimer, the term of this patent is extended or adjusted under 35 U.S.C. 154(b) by 840 days.

(21) Appl. No.: 17/814,104

(22) Filed: Jul. 21, 2022

(65) Prior Publication Data

US 2023/0021744 A1 Jan. 26, 2023

(30) Foreign Application Priority Data

Jul. 21, 2021 (DE) .......................... 102021118821.0

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
CPC . B06B 1/0629; B06B 3/02; G01F 1/66; G01F 1/662; G01F 1/667–668;

(Continued)

(56) References Cited

U.S. PATENT DOCUMENTS 4,930,358 A * 6/1990 Motegi ................... G01F 1/662
73/861.28
7,469,599 B2 12/2008 Froehlich et al.
(Continued)

FOREIGN PATENT DOCUMENTS

CN 111060171 A 4/2020
DE 19542232 A1 5/1997
(Continued)

OTHER PUBLICATIONS

Kang et al, Flow measurement based on two-dimensional flexural ultrasonic phased arrays, Acoustical Society of America, Proceedings of Meetings on Acoustics, vol. 32, 045012 (2018) (Year: 2018).*

(Continued)

*Primary Examiner* — David L Singer
(74) *Attorney, Agent, or Firm* — Muncy, Geissler, Olds & Lowe, P.C.

(57) ABSTRACT

An ultrasonic flowmeter includes first and second ultrasonic transducers and a control and evaluation unit connected thereto. The first and/or second ultrasonic transducer is/are an ultrasonic transmitter and/or an ultrasonic receiver. The first and second ultrasonic transducers are arranged on a measuring tube in such a way that a signal path is formed therebetween, and such that a measuring signal emitted by the ultrasonic transmitter runs via the signal path to the ultrasonic receiver. The first and/or second ultrasonic transducer has array of at least two active elements. At least one ultrasonic transducer with an array of at least two active elements is formed as a wedge transducer. At least two active elements of the array arranged on the first ultrasonic transducer, and/or at least two active elements of the array arranged on the second ultrasonic transducer, are separately controllable by the control and evaluation unit.

11 Claims, 10 Drawing Sheets

(58) Field of Classification Search
CPC ......... G01H 11/08; G01N 2291/02836; G01N 2291/0427; G01N 29/262; G10K 11/34; G10K 11/341–348
See application file for complete search history.

(56)                    References Cited

U.S. PATENT DOCUMENTS

| | | | |
|---|---|---|---|
| 8,347,734 B2 | 1/2013 | Berger et al. | |
| 9,347,808 B2 * | 5/2016 | Barkin | G01F 1/667 |
| 2006/0117867 A1 | 6/2006 | Fröhlich et al. | |
| 2011/0094309 A1 | 4/2011 | Berger et al. | |
| 2014/0000339 A1 | 1/2014 | Funck | |
| 2015/0160053 A1 | 6/2015 | Baumoel | |
| 2016/0305805 A1 * | 10/2016 | Baumoel | G01F 1/663 |
| 2021/0080303 A1 | 3/2021 | Wiest et al. | |

FOREIGN PATENT DOCUMENTS

| | | | | |
|---|---|---|---|---|
| DE | 10248593 A1 | 4/2004 | | |
| DE | 102006029199 B3 * | 1/2008 | ............. | G01F 1/665 |
| DE | 102008029772 A1 | 12/2009 | | |
| DE | 102011005170 A1 | 9/2012 | | |
| DE | 102014106429 A1 * | 1/2015 | ................ | G01P 5/24 |
| DE | 102015106695 A1 * | 11/2016 | ........... | G01F 1/7082 |
| DE | 102018122584 A1 * | 9/2019 | ........... | G01N 29/024 |
| DE | 102018008393 A1 | 4/2020 | | |
| WO | 2010057480 A2 | 5/2010 | | |

OTHER PUBLICATIONS

Nguyen et al, Multi-Angle Liquid Flow Measurement Using Ultrasonic Linear Array Transducer, Multidisciplinary Digital Publishing Institute (MDPI), Sensors 2020, 20, 388 (Year: 2020).*

Klambauer et al, Evaluation of an Ultrasonic Phased Array Flow Sensor for Harsh Environment, Conference Oct. 27-30, 2019, IEEE Sensors (Year: 2019).*

Choudhary et al, Numerical simulation of beam drift effect in ultrasonic flow-meter, Elsevier, Measurement 146 (2019) 705-717 (Year: 2019).*

* cited by examiner

19

ULTRASONIC FLOWMETER AND METHOD FOR OPERATING AN ULTRASONIC FLOWMETER

TECHNICAL FIELD

The invention is based on an ultrasonic flowmeter comprising at least a first ultrasonic transducer and a second ultrasonic transducer and further comprising a control and evaluation unit, where the control and evaluation unit is connected to the first ultrasonic transducer and the second ultrasonic transducer, wherein the first ultrasonic transducer and/or the second ultrasonic transducer is/are designed as an ultrasonic transmitter and/or ultrasonic receiver, wherein the first ultrasonic transducer and/or the second ultrasonic transducer is or are designed as a wedge transducer, wherein the first ultrasonic transducer and the second ultrasonic transducer are arranged on a measuring tube in such a way that a signal path is formed between the first and the second ultrasonic transducer, so that a measuring signal emitted by the ultrasonic transmitter runs via the signal path to the ultrasonic receiver.

Furthermore, the invention relates to a method for operating an ultrasonic flowmeter, wherein the ultrasonic flowmeter comprises at least a first ultrasonic transducer and a second ultrasonic transducer and a control and evaluation unit, wherein the control and evaluation unit is connected to the first ultrasonic transducer and the second ultrasonic transducer, wherein the first ultrasonic transducer and/or the second ultrasonic transducer is/are designed as an ultrasonic transmitter and/or ultrasonic receiver, wherein the first ultrasonic transducer and/or the second ultrasonic transducer is or are designed as a wedge transducer, wherein the first ultrasonic transducer and the second ultrasonic transducer are arranged on a measuring tube in such a way that a signal path is formed between the first and the second ultrasonic transducer, so that a measuring signal emitted by the ultrasonic transmitter runs via the signal path to the ultrasonic receiver.

BACKGROUND

Ultrasonic flowmeters known from the prior art are often optimized for the measurement of fixed media in expected ranges of a flow velocity. For this, the ultrasonic transducers are arranged on the measuring tube in such a way that a signal path is formed between the ultrasonic transducers, the geometry of which is adapted to the expected measuring regions and conditions.

However, in the case of measurement under conditions deviating from this, in detail of high flow velocities or other media or varying media properties, such measuring devices often have the disadvantage that the transmission of the measuring signal and thus the amplitude of the measuring signal captured at the receiver is reduced due to the change in the geometry of the signal path between the ultrasonic transducers. For example, at particularly high flow rates, the measuring signal is scattered by the entrainment effect so that it no longer optimally hits the ultrasonic receiver.

Particularly with clamp-on devices, readjustment is necessary when the sound velocity of the medium changes. A change in the medium or in the sound velocity of the medium due to changing process parameters results in a change in the coupling angle of the measuring signal into the measuring tube, which also influences the course of the signal path of the measuring signal. As a result, the amplitude detected at the ultrasonic receiver decreases, and in the worst case, the ultrasonic receiver no longer captures the measuring signal.

SUMMARY

Based on the prior art set forth, it is therefore an object of the invention to provide an ultrasonic flowmeter which has a particularly high range of application. Furthermore, it is the object of the invention to disclose an improved method for operating an ultrasonic flowmeter.

In principle, an ultrasonic flowmeter within the scope of the present invention comprises the determination of the flow rate or the flow velocity based on the known conventional measuring methods, in particular based on the transit time principle or on the Doppler principle or on the drift principle.

In the context of the present invention, the measuring tube may be part of the ultrasonic flowmeter. Alternatively, however, the measuring tube may also be part of a system, wherein the flowmeter is arranged on or at the measuring tube for operation.

According to a first teaching of the invention, the aforementioned object is achieved by an ultrasonic flowmeter mentioned at the beginning in that the first ultrasonic transducer has a first array of at least two active elements and/or in that the second ultrasonic transducer has a second array of at least two active elements, wherein at least one ultrasonic transducer having an array of at least two active elements is designed as a wedge transducer, wherein at least two active elements of the array arranged on the first ultrasonic transducer can be controlled separately by the control and evaluation unit and/or wherein at least two active elements of the array arranged on the second ultrasonic transducer can be controlled separately by the control and evaluation unit.

In this case, the control and evaluation unit controls the active elements in each case with control parameters, such as a phase, a frequency and an amplitude.

Particularly preferably, each ultrasonic transducer comprising an array of at least two active elements is designed as a wedge transducer.

According to the invention, it has been recognized that the use of an ultrasonic transducer formed as a wedge transducer, wherein the ultrasonic transducer comprises an array of at least two active elements, is advantageous in that a measuring signal emitted by the array is composed of at least two components, namely at least a first ultrasonic signal and a second ultrasonic signal.

In that at least two active elements can be controlled separately, it is possible to influence the shape and/or the radiation angle of the measuring signal. For this, the individual active elements can be operated with a time offset and/or with different amplitude and/or with different phase. As a result, the shape of the measuring signal and/or the geometry of the signal path traversed by the measuring signal can be influenced and, in particular, adapted to changes during operation so that the ultrasonic flowmeter can always operate under optimum conditions.

The measuring signal resulting from the superposition of the individual ultrasonic signals has at least one main lobe. The main lobe is aligned with the receiver during operation to determine the flow rate. Depending on the design and/or control of the array, the measuring signal has at least two side lobes and/or at least two grating lobes.

The side lobes are essentially influenced by the control of the active elements, in particular by the amplitude with which the individual active elements are controlled.

The grating lobes are repetitions of the main lobe including any side lobes. The occurrence of grating lobes is influenced by the distance d of the active elements. Here, the distance d of the active elements is understood to be the distance between the centers of the active elements.

Particularly preferably, the array is designed and/or the array is controlled during operation in such a way that substantially no side lobes and/or grating lobes are formed.

Alternatively, the array may be formed and/or controlled such that exactly two grating lobes result.

The present invention relates to influencing the measuring signal by means of a phased array. Insofar as the first ultrasonic signal and the second ultrasonic signal are transmitted with a time offset, this time offset is so minimal that the superposition of the signals causes a common measuring signal to reach the receiver, so that the first ultrasonic signal and the second ultrasonic signal cannot be distinguished at the receiver. Thus, the invention does not relate to a time division multiplexing method in which signals are emitted and/or transmitted one after the other individually, i.e., without overlapping.

Alternatively or additionally, in the case in which the at least one array is designed as a receiving element, the at least one array has a reception characteristic which results from the signals measured at the individual active elements being superimposed on one another with a time delay and/or phase shift and/or weighted with different amplitudes.

In this respect, the reception characteristic can also be adapted to a process-related change in the signal path during operation in such a way that the ultrasonic flowmeter can always operate under optimized conditions.

Particularly preferably, the at least one wedge transducer comprising the array of active elements is arranged on the measuring tube in such a way that radiation of the measuring signal perpendicular to the slope of the wedge defines a signal path that optimally impinges on the ultrasonic receiver in the case of expected media and expected flow. The radiation of the measuring signal perpendicular to the slope of the wedge corresponds to a non-pivoted measuring signal, i.e. a pivot angle of 0°. This has the advantage that a change in the radiation angle of the measuring signal must be small when operating conditions change in order to counteract the operational effect on the measuring signal.

Basically, an active element in the context of the present invention is an electro-acoustic transmitter and/or receiver element.

According to one design, exactly one ultrasonic transducer is formed as a wedge transducer comprising an array of at least two active elements.

According to a further design, the first ultrasonic transducer comprises a first array of at least two active elements and the second ultrasonic transducer comprises a second array of at least two active elements. This design is particularly advantageous because, during operation, both the measuring signal that is emitted in the direction of flow and the measuring signal that is emitted against the direction of flow can be influenced by controlling the individual active elements.

In addition, both for the measurement in the direction of flow and for the measurement against the direction of flow, the array formed as a receiver can be adapted to the reception of the measuring signal.

According to a preferred design, an array of at least two active elements comprises more than two active elements.

Particularly preferably, all active elements of an array can be controlled separately by the control and evaluation unit.

Alternatively, an array has at least two groups of active elements, wherein the active elements assigned to a group can be controlled together and wherein at least one group has at least two active elements.

According to a next advantageous design, the first ultrasonic transducer comprises a first array of at least two active elements and the second ultrasonic transducer comprises a second array of at least two active elements, wherein the first array and the second array have the same number of active elements or a different number of active elements.

If the first array has the same number of active elements as the second array, the ultrasonic transducers can be manufactured particularly easily.

If the number of active elements of the first array is different from the number of active elements of the second array, the number of active elements required for operation can be advantageously minimized. This has the advantage of simplifying the overall manufacture and operation of the ultrasonic flowmeter.

According to a further preferred design, the first ultrasonic transducer comprises a first array of at least two active elements and the second ultrasonic transducer comprises a second array of at least two active elements, wherein the first array and the second array have an identical arrangement or a different arrangement of the active elements.

If the first array and the second array have an identical arrangement of the active elements, the variation of the radiation angle of the measuring signal emitted in the flow direction can be identical to the variation of the radiation angle of the measuring signal emitted against the flow direction.

According to an alternative design, the first array and the second array have a different arrangement of the active elements. Particularly preferably, the first array and the second array are tuned to each other in such a way that undesired portions of the measuring signal emitted by the ultrasonic transmitter array can be suppressed by minima in the reception characteristic of the ultrasonic receiver array.

According to a next design, the first array and/or the second array is or are formed two-dimensionally at least in regions. This design has the advantage that during operation the measuring signal can be spatially pivoted.

In principle, the slope of the wedge can be planar or curved. If, according to one design, the slope of the wedge is curved, the maximum pivot angle in the edge area of the measuring tube can be increased.

According to a further design, the first array and/or the second array is or are formed one-dimensionally at least in areas. This design is particularly advantageous if the first array and the second array are aligned to one another at an angle.

For example, the second array is oriented substantially perpendicular to the first array.

This design has the advantage that the radiation angle of the measuring signal can be changed overall in two planes, while at the same time minimizing the number of active elements required.

A next embodiment is characterized in that the first array and/or the second array is/are produced by introducing at least one gap into an electro-acoustic substrate, so that the substrate has at least two separately contactable areas on the upper side and a common ground connection on the lower side, wherein the at least one gap is preferably filled with an acoustically insulating material.

The gap can be introduced into the substrate, for example, by sawing or etching or by another suitable method.

The electro-acoustic substrate is preferably a piezoelectric substrate.

Alternatively, the first array and/or the second array can be produced by applying an electro-acoustic substrate to a substrate and by introducing at least one gap into the electro-acoustic substrate, wherein the gap completely cuts through the electro-acoustic substrate, wherein the at least one gap is preferably filled with an acoustically insulating material.

By filling the gap, crosstalk between the individual active elements can be avoided or at least minimized. For example, the at least one gap is filled with silicone or epoxy resin or rubber.

According to a next design of the ultrasonic flowmeter, the number of active elements and the geometry of the first array and/or the second array is determined depending on the expected maximum pivot angle, preferably minimizing the number of active elements at the same time.

In detail, the total length L of the array determines the width of the main lobe of the measuring signal. The distance d between the active elements determines the angular distance between the main lobe and the grating lobes. By adjusting the width of the active elements appropriately, the amplitude of the grating lobes can be attenuated.

A construction of an array of active elements can advantageously comprise the following steps:

First, to determine the width of the main lobe, the total length L of the array is determined.

Then, the required maximum pivot angle $\rho_0$ at which the main lobe is to be radiated is determined.

Based on this, the minimum tolerable angular distance of the grating lobes to the main lobe is determined. This should be dimensioned in such a way that the grating lobes do not influence the measurement. The grating lobes can also be attenuated by adjusting the width w of the active elements.

Finally, the maximum spacing of the active elements and furthermore the minimum required number of active elements are determined.

By minimizing the number of active elements, the electronics of the control and evaluation unit can also be simplified, since fewer channels need to be available to control the individual active elements.

Particularly preferably, the number of active elements and/or the geometry of the first array and the second array are tuned to each other in such a way that unwanted signal components, for example side lobes and/or grating lobes, of the measuring signal transmitted by the ultrasonic transmitter are suppressed by minima in the reception characteristic of the ultrasonic receiver.

According to a next advantageous design, the first ultrasonic transducer and/or the second ultrasonic transducer comprises an electro-acoustic substrate comprising at least a first and a second electro-acoustic disc, wherein the first and the second electro-acoustic disc are arranged on top of each other and wherein the array of active elements of this ultrasonic transducer is arranged in the first electro-acoustic disc and/or in the second electro-acoustic disc.

If at least one active element is arranged on both the first electro-acoustic disc and the second electro-acoustic disc, it is also possible to influence the frequency of the measuring signal in addition to varying the radiation angle of the measuring signal. If the active elements are separately controllable, the electro-acoustic discs can also be separately excited to oscillation. Accordingly, for example, one electro-acoustic disc can be excited, with the other disc resonating. Alternatively, both discs can be excited to oscillation. By varying the oscillating disk, the frequency of the measuring signal can thus also be varied.

The ultrasonic flowmeter can thus be adapted particularly flexibly to different measurement situations.

Particularly preferably, the ultrasonic flowmeter is designed for carrying out one of the methods described below.

According to a second teaching of the present invention, the object mentioned at the beginning is achieved by a method described at the beginning for operating an ultrasonic flowmeter in that the first ultrasonic transducer has a first array of at least two active elements and/or that the second ultrasonic transducer has a second array of at least two active elements, wherein at least two active elements of the array arranged on the first ultrasonic transducer are controlled separately by the control and evaluation unit, and/or that at least two active elements of the array arranged on the second ultrasonic transducer are controlled separately by the control and evaluation unit, and that the control and evaluation unit controls the array functioning as an ultrasonic transmitter in such a way that the radiation angle of the measuring signal is varied at least at times and/or that the control and evaluation unit varies the reception characteristic of the array functioning as an ultrasonic receiver at least at times, so that, in order to determine the flow rate during measurement, the measuring signal impinges on the ultrasonic receiver in an optimized manner and/or the ultrasonic receiver receives the measuring signal in an optimized manner with respect to the radiation angle.

Particularly preferably, the method according to the invention can also be used to suitably place and align the ultrasonic transducers on the measuring tube in such a way that the ultrasonic transmitter array emits the measuring signal without pivoting and that the ultrasonic receiver array receives the measuring signal without pivoting. For this, the ultrasonic transducers are first placed on the measuring tube in such a way that a measuring signal emitted by the ultrasonic transmitter reaches the ultrasonic receiver via the signal path. By pivoting the reception characteristic, the pivot angle at which the receiver receives the measuring signal in an optimized manner is determined at the receiver. Based on the pivot angle, the control and evaluation unit determines a position for the ultrasonic transmitter and/or the ultrasonic receiver, taking into account the geometry of the signal path, at which the ultrasonic transmitter array transmits the measuring signal without pivoting and at which the ultrasonic receiver array receives the measuring signal without pivoting. In this manner, the ultrasonic transducers on the measuring tube can be adjusted to each other before commissioning or also at regular or irregular intervals.

According to one design, at least the ultrasonic transducer operating as an ultrasonic transmitter in one operating state has an array of at least two active elements, wherein the at least two active elements of the ultrasonic transmitter can be controlled separately by the control and evaluation unit, wherein in the first operating state the first active element of the ultrasonic transmitter emits a first ultrasonic signal, and wherein the second active element of the ultrasonic trans-
mitter emits a second ultrasonic signal, such that the first ultrasonic signal and the second ultra-
sonic signal overlap to form the measuring signal.

The ultrasonic receiver receives the measuring signal and
forwards it to the control and evaluation unit, which deter-
mines the flow rate taking into account the received mea-
suring signal.

According to a particularly preferred design of the
method, the measuring signal has at least one main lobe due
to the superposition of at least the first ultrasonic signal and
the second ultrasonic signal. In addition, the measuring
signal can also have at least two side lobes and/or at least
two grating lobes.

According to a further particularly preferred design, the
first ultrasonic signal and the second ultrasonic signal are
emitted at least at times with a time delay and/or with
different amplitude and/or with different phase, whereby the
radiation angle of the measuring signal, in particular of the
main lobe of the measuring signal, is changed. In this
manner, the signal path traversed by the measuring signal
can be changed so that the maximum of the measuring
signal, in particular the maximum of the main lobe, hits the
ultrasonic receiver in an optimized manner.

Alternatively or additionally, the signals measured at the
individual active elements of the array functioning as an
ultrasonic receiver can, at least temporarily, be superim-
posed on one another with a time delay and/or phase shift
and/or weighted with different amplitudes. In this manner,
the reception characteristic can be pivoted, whereby it is also
achieved that the maximum of the measuring signal, in
particular the maximum of the main lobe, hits the ultrasonic
receiver in an optimized manner.

According to a further design of the method, at least one
array is formed two-dimensionally at least regionally, so that
the radiation angle of the measuring signal, in particular of
the main lobe, and/or the reception characteristic of the array
can be varied within a solid angle. This has the advantage
that both in the case in which the measuring signal does not
hit the ultrasonic receiver or does not hit it in the best
possible way due to a velocity deviating from the expected
velocity, the coupling of the measuring signal can be read-
justed so that the measuring signal hits the ultrasonic
receiver in an optimized manner. In addition, the measuring
signal can also be pivoted into the edge area of the measur-
ing tube in such a way that it is also possible to measure edge
areas of the flow profile. Furthermore, the reception char-
acteristics of the array can also be adapted to a change in the
signal path of the measuring signal.

According to a next design of the method, the control and
evaluation unit monitors the amplitude of the measuring
signal captured by the ultrasonic receiver, wherein the
radiation angle of the measuring signal and/or the reception
characteristic is changed by the control and evaluation unit
if the amplitude falls below a threshold value.

According to a particularly preferred design of the
method, the control and evaluation unit varies the radiation
angle of the measuring signal and/or the reception charac-
teristic of the ultrasonic receiver at regular or irregular
intervals in order to maximize the measuring signal at the
ultrasonic receiver, wherein the control and evaluation unit
captures a maximum of the amplitude at the ultrasonic
receiver during the variation as well as the corresponding
control parameters of the active elements thereto, and that
the control and evaluation unit subsequently controls the
array of the at least two active elements of the ultrasonic transmitter and/or of the ultrasonic receiver in accordance
with the determined control parameters.

The variation of the beam angle is preferably by a preset
angle, for example of about 5° or of about 10° or of about
20°, around the current position of the main lobe.

For example, the control and evaluation unit varies the
beam angle of the measuring signal with a frequency of 1 Hz
or 0.1 Hz or 0.01 Hz.

This regular slight pivoting of the measuring signal or the
reception characteristic ensures that the flowmeter recog-
nizes and uses optimized control parameters for the ultra-
sonic transmitter and/or the ultrasonic receiver during opera-
tion.

As a result, the measuring signal always reaches the
ultrasonic receiver in an optimized manner during measure-
ment operation.

At the beginning of the measurement operation, the pivot
angles at the ultrasonic transmitter and at the ultrasonic
receiver are preferably aligned identically. Subsequently, the
alignment of the ultrasonic transmitter and/or the alignment
of the ultrasonic receiver is varied in such a way that the
ultrasonic receiver optimally receives the measuring signal.

Alternatively or additionally, the control and evaluation
unit adjusts the radiation angle of the measuring signal
emitted by the ultrasonic transmitter and/or the reception
characteristic of the ultrasonic receiver depending on the
measured flow velocity of the medium and/or depending on
the sound velocity of the medium, such that the measuring
signal at the ultrasonic receiver is at a maximum.

For this, the control and evaluation unit particularly
preferably has a memory unit, wherein a relationship
between a radiation angle of the measuring signal or, respec-
tively control parameters for the array of active elements and
different media and/or different flow rates and/or different
sound velocities is stored in the memory unit, so that when
the flow rate changes and/or when the medium changes
and/or when the sound velocity of the medium changes due
to changing process parameters, the control and evaluation
unit automatically adjusts the radiation angle of the mea-
suring signal and/or the control parameters for the array of
active elements and/or the reception characteristic of the
ultrasonic receiver in accordance with the stored relation-
ship.

Conversely, by storing the relationship between a radia-
tion angle of the measuring signal or control parameters for
the array of active elements and different media and/or
different flow rates in the memory unit, a flow rate and/or a
medium can be determined from an optimum radiation angle
found by the control and evaluation unit. In this respect, the
flow rate can be determined by the control and evaluation
unit in two ways, which serve as mutual control authority. In
detail, the flow velocity can be determined both based on the
principle underlying the measuring device and by evaluating
the pivot angle in combination with the stored context. In
addition, conclusions can also be drawn about acoustic
properties of the medium by means of the adjusted angle of
radiation.

In addition to the possibility of maximizing the signal at
the ultrasonic receiver by adjusting the measuring signal, the
alignment of the measuring signal or part of the measuring
signal can also be used to obtain information about an
operating state and/or about the measurement environment.

For this, the measuring signal has, for example, at least
one main lobe and at least two side lobes and/or two grating
lobes, wherein the at least one main lobe or at least one side
lobe or at least one grating lobe is aligned at least tempo-
rarily with the measuring tube in such a manner that the side lobe or the grating lobe is reflected at the measuring tube and the reflection is received again by the array of active elements previously operating as an ultrasonic transmitter, wherein the control and evaluation unit determines from the reflection of the at least one main lobe or the one side lobe or the grating lobe at least one piece of information about an operating state and/or the measurement environment. For example, the control and evaluation unit determines the thickness of the measuring tube wall and/or the inner measuring tube diameter. By repeatedly determining the thickness of the measuring tube wall, deposits on the measuring tube wall can be detected, for example. In particular, the resulting reduction of the measuring tube diameter can be taken into account when determining the mass flow rate.

Alternatively or additionally, the main lobe or a side lobe or a grating lobe can be aligned with the measuring tube in such a way that it excites a Lamb wave in the measuring tube wall, which propagates along the measuring tube wall in the direction of the ultrasonic receiver and is captured by the ultrasonic receiver, wherein the amplitude and/or the transit time and/or the spectrum of the Lamb wave is evaluated. According to this design, the propagation velocity of the measuring signal within the measuring tube wall can be determined, which improves the knowledge of the coupling into the measuring tube and thus the knowledge of the signal path traversed by the measuring signal. In addition, deposits on the measuring tube wall can also be detected from the propagation characteristics of the Lamb wave. Of course, this also works if the ultrasonic transmitter does not have an array of active elements.

Particularly preferably, the flowmeter is designed to carry out one of the methods described above according to one of the designs described above.

BRIEF DESCRIPTION OF THE DRAWINGS

There are now a multitude of possibilities for designing and further developing the ultrasonic flowmeter according to the invention and the method for operating the ultrasonic flowmeter. For this, reference is made to the following description of preferred embodiments in conjunction with the drawings.

DETAILED DESCRIPTION

Figure 1:
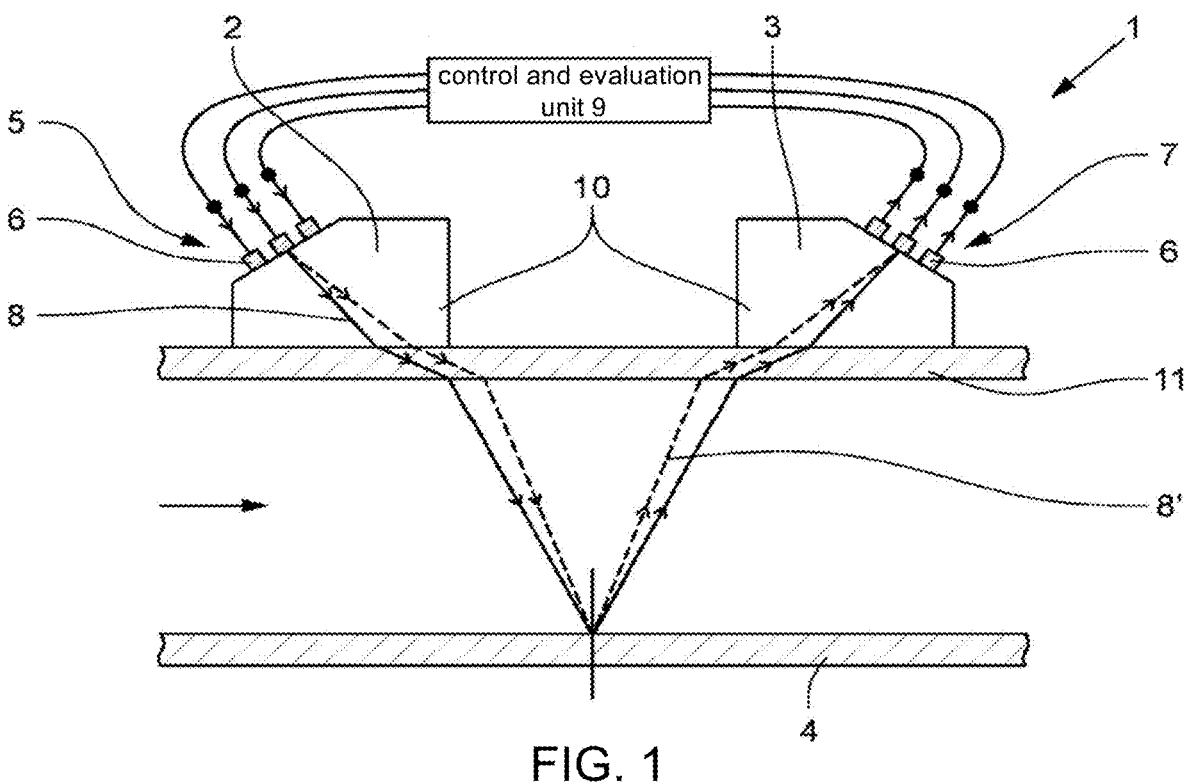
FIG. 1 illustrates a first embodiment of an ultrasonic flowmeter according to the invention.

FIG. 1 shows a first embodiment of an ultrasonic flowmeter 1, with a first ultrasonic transducer 2 and a second ultrasonic transducer 3, wherein the first ultrasonic transducer 2 is designed as a wedge transducer and wherein the second ultrasonic transducer 3 is also designed as a wedge transducer and wherein the ultrasonic transducers 2, 3 are arranged on a measuring tube 4.

The first ultrasonic transducer 2 has a first array 5 of active elements 6, wherein the array 5 is arranged such that the measuring signal 8 emitted by the array 5 in a first operating state 25 is emitted into the measuring tube 4 in the direction of the second ultrasonic transducer 3.

The second ultrasonic transducer 3 has a second array 7 of active elements 6, wherein the second array 7 is arranged such that it receives the measuring signal 8 emitted in the first operating state 25 and also emits a measuring signal 8 in the direction of the first ultrasonic transducer 2 in a second operating state 26.

Both arrays 5 and 7 are formed in two dimensions, i.e. the active elements 6 are arranged in a two-dimensional plane. Moreover, the slope of the wedges 10 of the ultrasonic transducers is planar in each case.

In addition, a control and evaluation unit 9 is provided which separately controls the active elements 6 with control parameters.

If, during operation, the active elements 6 of the ultrasonic transmitter are operated at least at times with a time delay and/or with different amplitude and/or different phase, i.e. with varying control parameters, the radiation angle of the measuring signal 8 and, in this respect, the angle at which the measuring signal 8 couples into the measuring tube 4 can be varied.

The flowmeter 1 shown is configured such that in a first operating state 25 the first array 5 emits a measuring signal 8 and the second array 7 receives the measuring signal 8, and that in a second operating state 26 the second array 7 emits a measuring signal 8 which the first array 5 receives.

The measuring signal 8 emitted by the array 5, 7 first passes through the wedge, is then refracted in the measuring tube wall 11, and is finally refracted from the measuring tube wall 11 into the interior of the measuring tube 4.

The angle of coupling into the inside of the measuring tube depends on the sound velocity of the medium and thus also on the medium arranged in the measuring tube 4.

During operation, it can therefore occur that the intensity captured at the ultrasonic receiver decreases when the sound velocity of the medium changes due to deflection of the measuring signal 8. Similarly, the intensity of the measuring signal 8 at the ultrasonic receiver can decrease if the measuring signal 8 no longer fully impinges on the ultrasonic receiver at high flow velocities due to the drift effect.

Both effects can be counteracted by the possibility of varying the radiation angle of the measuring signal at the ultrasonic transmitter and/or by changing the reception characteristics at the ultrasonic receiver. In particular, the measuring signal 8 that is emitted in the direction of flow can be oriented differently than the measuring signal 8 that is emitted against the direction of flow.

The embodiment shown thus ensures optimized settings even if the process condition is outside the process condition initially specified for optimal operation.

Figure 2:
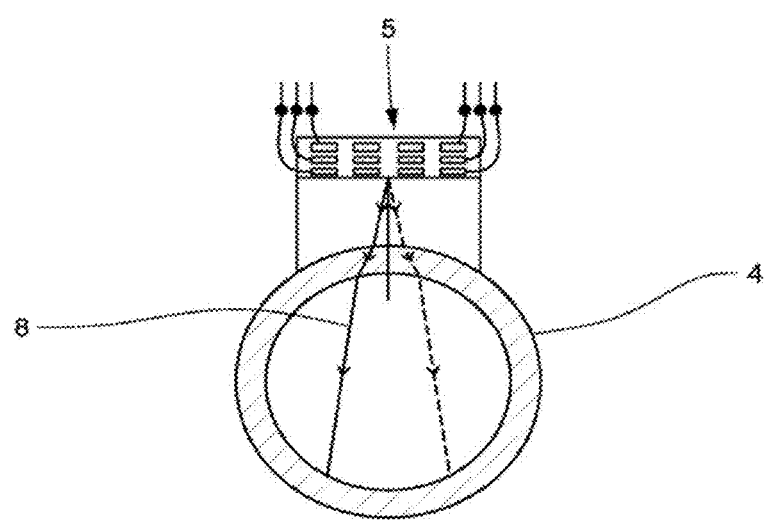
FIG. 2 illustrates a second embodiment of an ultrasonic flowmeter according to the invention.

FIG. 2 shows that the measuring signal 8 emitted by a two-dimensional array 5, 7 can also be emitted in the edge region of the measuring tube. This has the advantage that the flow profile can also be measured outside the center of the measuring tube in the edge region.

Figure 3:
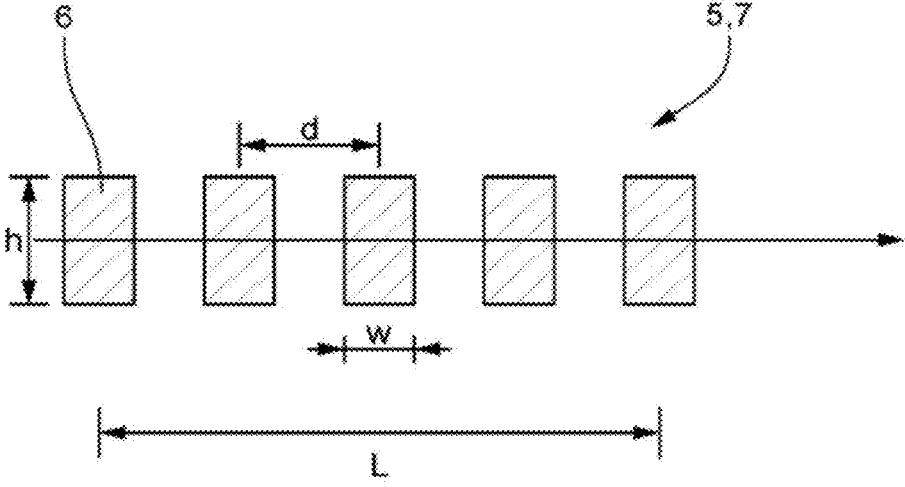
FIG. 3 illustrates a one-dimensional arrangement of active elements.

FIG. 3 shows a one-dimensional array 5, 7 of active elements 6. In the embodiment shown, the one-dimensional array 5, 7 has five active elements 6 arranged next to each other at a distance d. Each active element 6 has a height h and a width w. In this case, the active elements 6 are arranged at a sufficient distance d from each other so that crosstalk between the individual active elements 6 is prevented or at least minimized.

Figure 4:
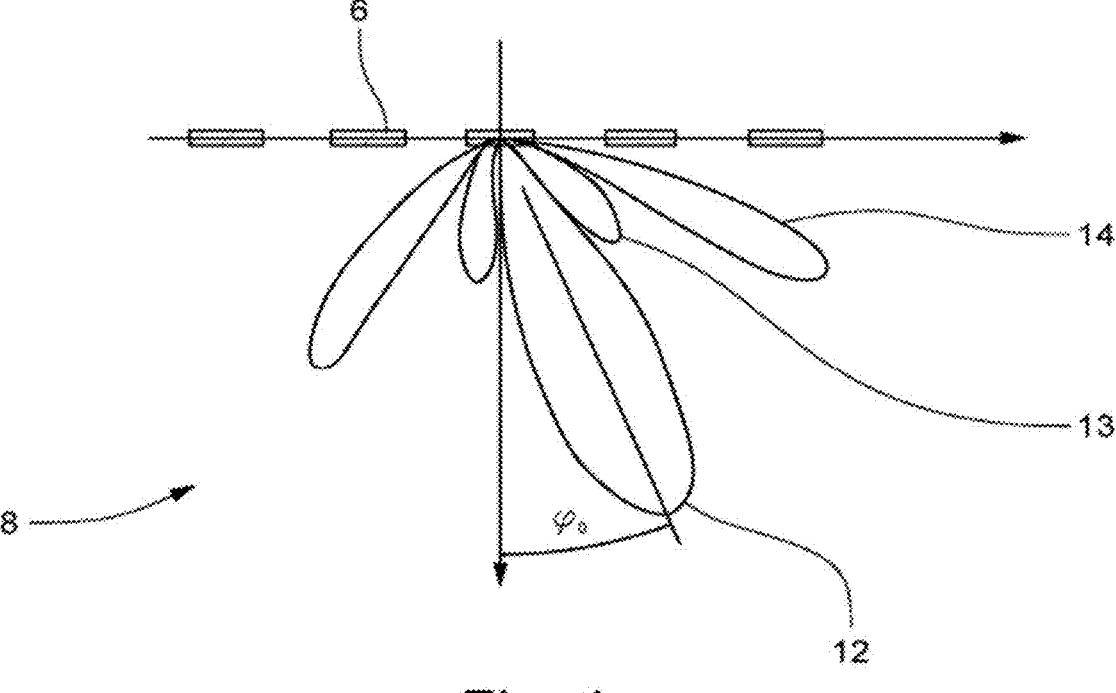
FIG. 4 illustrates a one-dimensional arrangement of active elements as well as the resulting radiation characteristic.

FIG. 4 shows the beam characteristics of the array 5,7 shown in FIG. 3 in the far field. The signals emitted by the individual active elements 6 are superimposed in the embodiment shown to form a measuring signal 8, which has a main lobe 12, two side lobes 13 and two grating lobes 14 in the far field. The main lobe 12 is radiated at an angle $\rho_0$.

Usually, the occurrence of side lobes 13 or grating lobes 14 is undesirable, since a part of the radiated power is also included in these side lobes. However, the side lobes 13 or grating lobes 14 can also be used to obtain information about tube properties and/or tube geometries or process conditions.

If the individual active elements 6 are operated separately and with a time delay and/or with different amplitude and/or different phase, the direction of the main lobe 12 can be varied. During operation, the main lobe 12 can be aligned with the ultrasonic receiver by appropriately controlling the active elements 6 in such a way that the intensity of the received signal is maximized.

Figure 5:
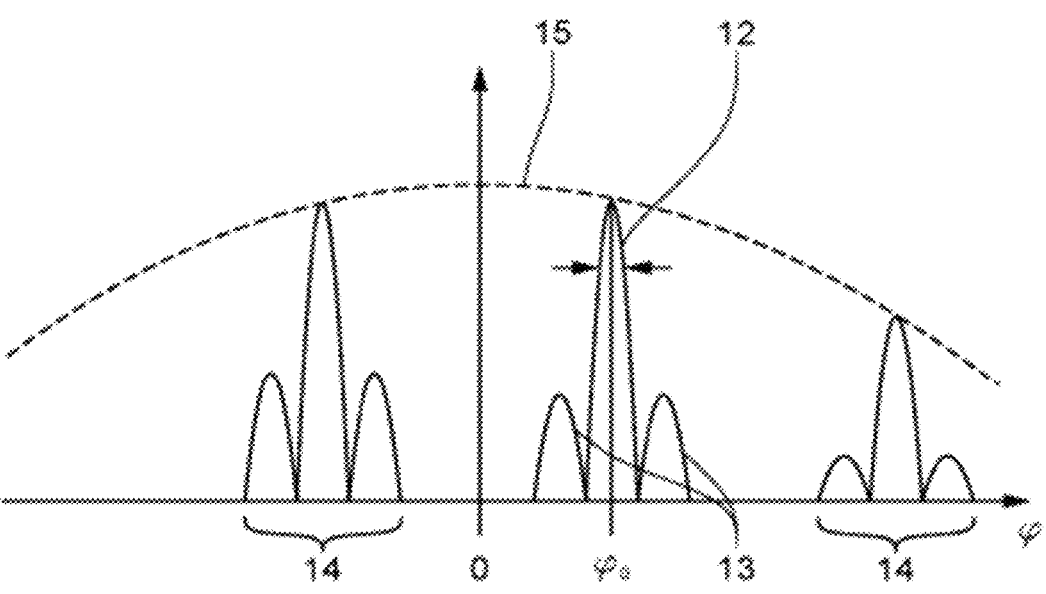
FIG. 5 illustrates a comparison of the radiation characteristics of an antenna array and a single active element.

FIG. 5 shows a comparison of the beam characteristics of a one-dimensional array 5, 7 of active elements 6 and a single active element 6. The radiation angle $\rho$ is plotted on the abscissa, where the zero point corresponds to perpendicular radiation. The amplitude of the measuring signal is plotted on the ordinate. Due to the discrete arrangement of individual active elements, the measuring signal 8 results in a combination of maxima and minima by interference. In contrast, the radiation pattern 15 of a single active element 6 exhibits a continuous distribution over the angular range under consideration.

At a beam angle $\rho_0$, the main lobe 12 is emitted by the array 5, 7. Side lobes 13 are formed next to the main lobe 12. In addition, two grating lobes 14 are present. The width of the main lobe is proportional to $\lambda/L$, where $\lambda$ is the wavelength of the measuring signal 8 and L is the total length of the array 5, 7. The angular distance of the grating lobes 14 from the main lobe 12 is proportional to $\lambda/d$, where $\lambda$ is the wavelength of the measuring signal 8 and d is the distance between the individual active elements 6. The angular extent of the radiation pattern 15 of a single active element 6 is proportional to $\lambda/w$, where $\lambda$ is the wavelength of the measuring signal 8 and w is the width of the active element 6.

In this respect, the shape of the measuring signal 8 can be adapted to the expected measurement situation by appropriate geometric design of the array 5, 7.

Figure 6:
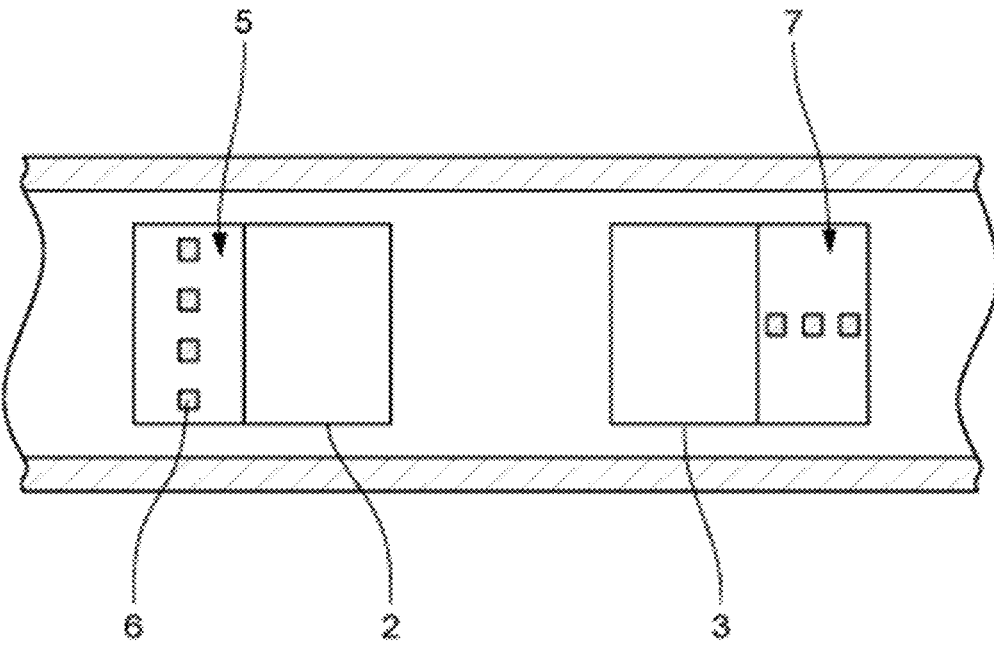
FIG. 6 illustrates an arrangement of a first one-dimensional array on a first ultrasonic transducer and a second one-dimensional array on a second ultrasonic transducer.

FIG. 6 shows the arrangement of a first one-dimensional array 5 on a first ultrasonic transducer 2 and a second one-dimensional array 7 on a second ultrasonic transducer 3. The first array 5 has four active elements 6, the second array 7 has three active elements 6 oriented perpendicularly to the first array 5.

When the first array 5 is in a first operating state 25 of the transmitting array, the measuring signal 8 propagates fan-like inside the measuring tube. Thereby, the orientation of the measuring signal 8 in the plane of the array 5 can be varied. In this first operating state 25, the second array 7 is the ultrasonic receiver. The second array 7 is oriented such that it captures the measuring signal in a fan-like manner. In this case, the orientation of the fan-like reception area can be varied along the measuring tube axis. This has the advantage that the total number of active elements 6 can be minimized.

If this second array 7 is in a next operating state 26 of the ultrasonic transmitter, it can emit a measuring signal 8 whose orientation can be varied along the measuring tube axis.

Overall, the measuring signal 8 can be varied in two planes during operation. However, compared to ultrasonic transducers that have two-dimensional arrays, the number of active elements 6 is minimized, so that as a result the ultrasonic flowmeter 1 has a less complex design.

Figure 7:
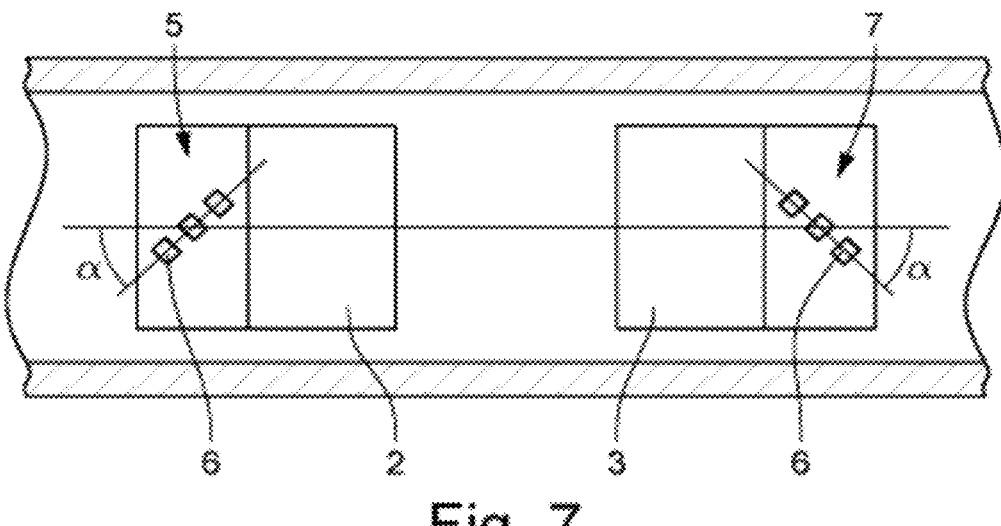
FIG. 7 illustrates a further arrangement of a first one-dimensional array on a first ultrasonic transducer and a second one-dimensional array on a second ultrasonic transducer.

In FIG. 7, a further arrangement of a first one-dimensional array 5 on a first ultrasonic transducer 2 and a second one-dimensional array 7 on a second ultrasonic transducer 3 is shown. Both arrays 5, 7 have three active elements 6 in the illustrated embodiment. The arrays 5, 7 are rotated in opposite directions to each other by an angle $\alpha$ starting from a parallel to the measuring tube axis. In the illustrated embodiment, the angle $\alpha$ is approximately 45°, so that the arrays 5, 7 have a largely identical input impedance and thus the best possible reciprocal operation with identical measuring signals 8 in and against the flow direction can be ensured.

Figure 8:
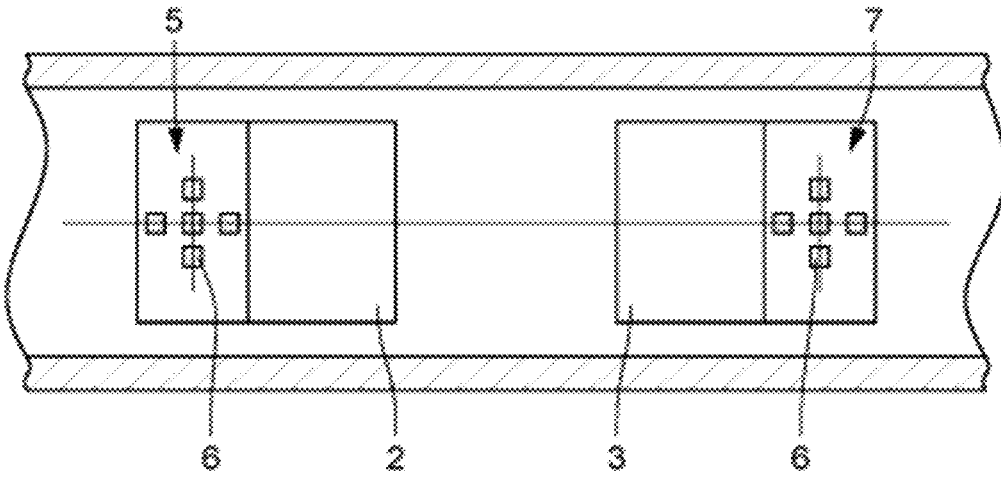
FIG. 8 illustrates a further arrangement of a first one-dimensional array on a first ultrasonic transducer and a second one-dimensional array on a second ultrasonic transducer.

FIG. 8 shows a further arrangement of a first two-dimensional array 5 on a first ultrasonic transducer 2 and a second two-dimensional array 7 on a second ultrasonic transducer 3. Both arrays 5 and 7 have a cross-shaped arrangement of the active elements 6 and are thus identically designed. During operation, both the measuring signal 8 emitted by the first array 5 and the measuring signal 8 emitted by the second array 7 can be varied at least in two planes. Due to the identical design and arrangement of the arrays 5 and 7, this embodiment also has the previously mentioned advantages that the arrays have a largely identical input impedance and thus the best possible reciprocal operation with identical measuring signals 8 in and against the flow direction can be ensured.

Figure 9:
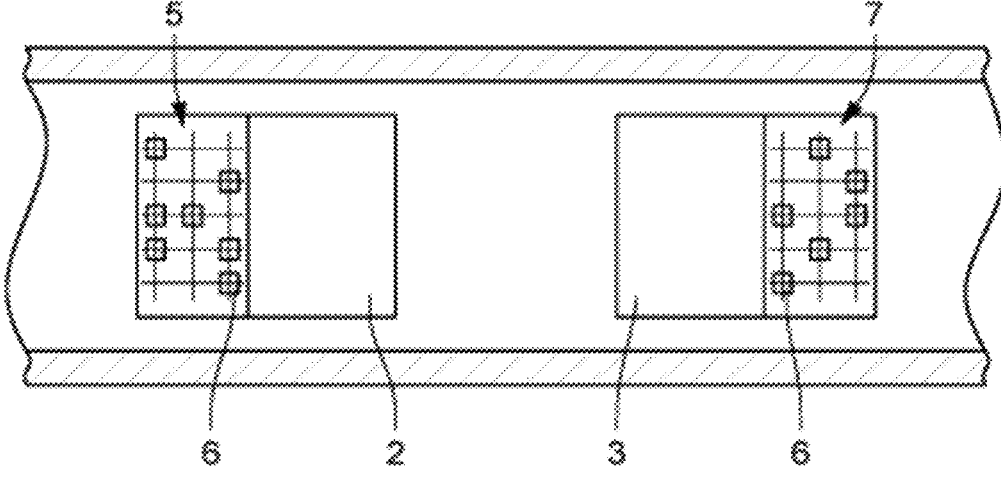
FIG. 9 illustrates a further arrangement of a first array on a first ultrasonic transducer and a second array on a second ultrasonic transducer.

FIG. 9 shows a further arrangement of a first two-dimensional array 5 on a first ultrasonic transducer 2 and a second two-dimensional array 7 on a second ultrasonic transducer 3. In both arrays 5 and 7, the active elements 6 are arranged irregularly on a regular grating and at least partially with a large spacing. If, in a first operating state 25, the first array 5 is designed as an ultrasonic transmitter, a narrow conical measuring signal 8 is emitted. Due to the partially large distances of the active elements 6 to each other, in addition to the main lobe 12, equally significant side lobes 13 and grating lobes 14 are simultaneously implemented. The second array 7 is constructed and controlled during operation in such a way that local minima of the radiation characteristic of the receiver are superimposed on the interfering grating lobes and/or side lobes of the measuring signal emitted by the ultrasonic transmitter 2.

Figure 10:
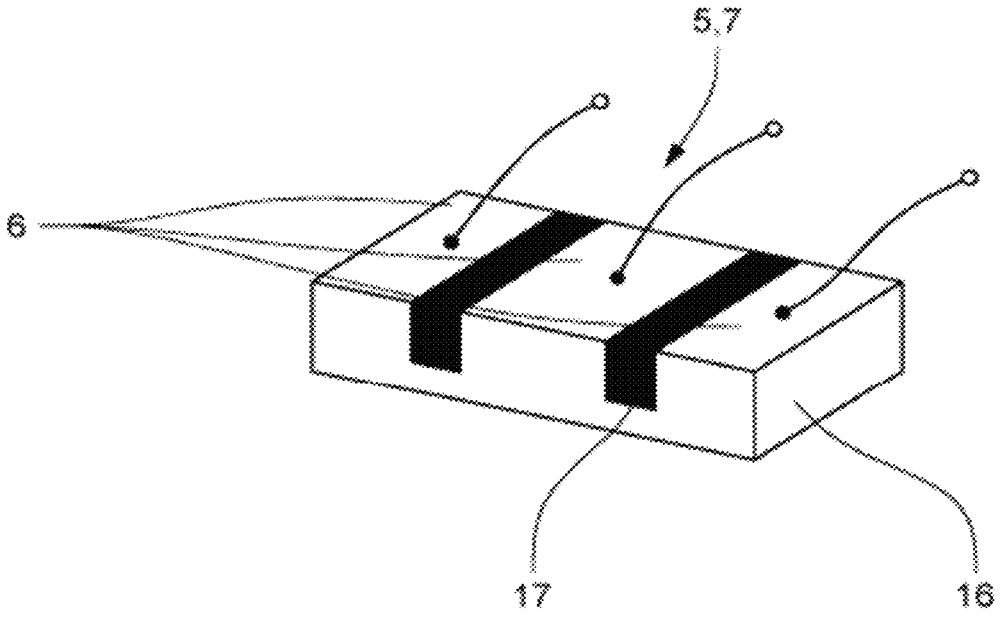
FIG. 10 illustrates an embodiment of a one-dimensional array of radiating elements.

An implementation of a one-dimensional array 5 of active elements 6 is shown in FIG. 10. For this, gaps 17 with a predetermined depth are sawn into a bar 16 of piezo-electric material. The upper electrodes are contacted individually and can therefore be controlled separately, while the lower electrode is designed as a common ground electrode. The gaps 17 are filled with a filler material, which, in particular, has a large acoustic attenuation in order to avoid crosstalk between the individual active elements 6.

Figure 11:
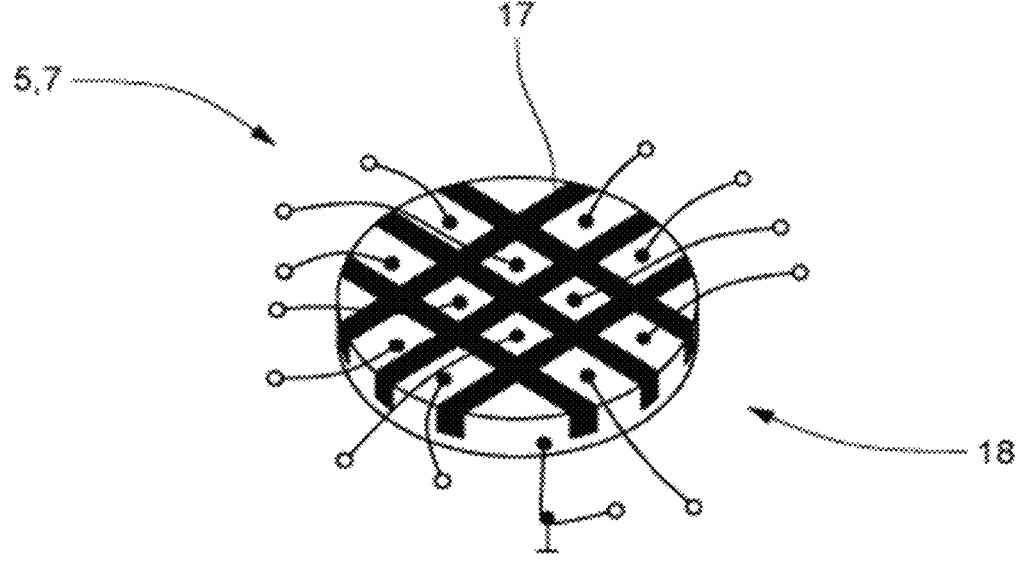
FIG. 11 illustrates another embodiment of a two-dimensional array of radiating elements.

FIG. 11 shows a further embodiment of an array 5, 7 of active elements made 20) by sawing gaps 17 in a piezo-electric disc 18 which are filled with an acoustically insulating material. In contrast to the embodiment shown in FIG. 9, the array 5, 7 of active elements 6 is formed in two dimensions. The lower electrode is also designed as a common ground electrode, as shown in FIG. 9.

During operation, all active elements 6 can be controlled separately, but it is also possible to only control some of the active elements 6.

According to an alternative embodiment, the piezo-electric substrate can be applied to a solid support, for example glued, and the piezo-electric substrate can be completely sawed through to produce the separate active elements 6, for example in such a way that the solid support also has a gap of a certain depth under the piezo-electric substrate. The solid support can, for example, be formed as a printed circuit board or be a plastic support or a metal support.

Figure 12:
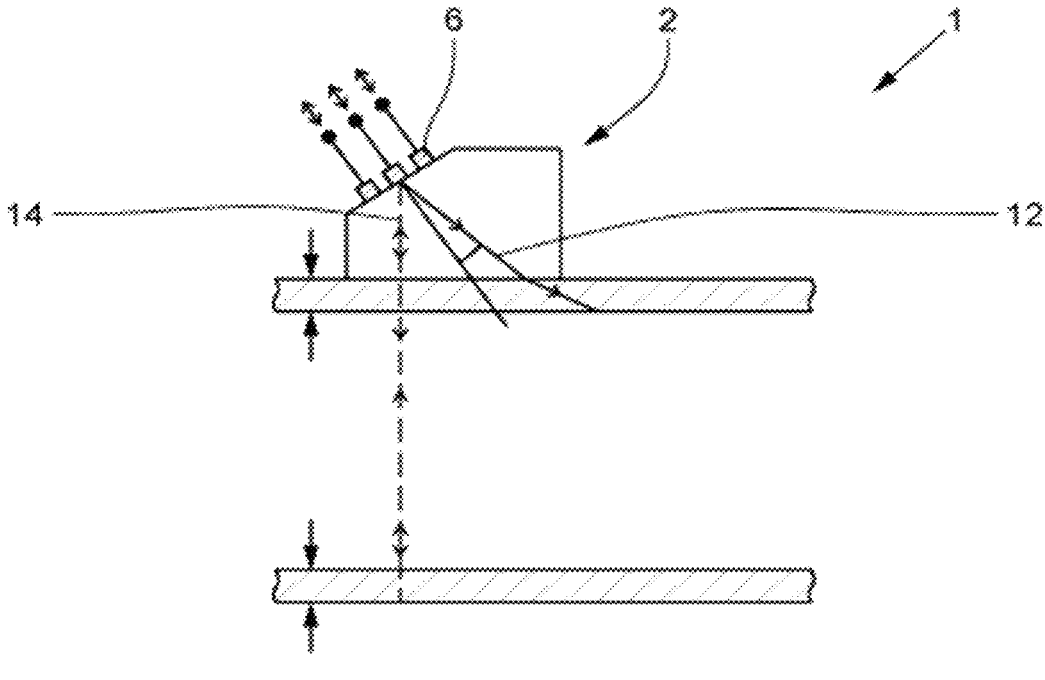
FIG. 12 illustrates a further embodiment of a flowmeter according to the invention.

FIG. 12 shows an embodiment of a flowmeter 1, wherein only the first ultrasonic transducer 2, which is formed as an ultrasonic transmitter in a first operating state, is shown. The first ultrasonic transducer 2 has an array 5 of active elements 6, which, during operation, emits a measuring signal 8 consisting of a main lobe and at least two side lobes 13 and two grating lobes 14. In the embodiment shown, the measuring signal 8 is aligned with the measuring tube in such a way that at least one grating lobe 14 impinges essentially perpendicularly on the measuring tube wall, and the reflection of the grating lobe 14 from the measuring tube is captured and evaluated. From the reflection, information about the measuring tube wall thickness can be obtained. According to this embodiment, for example, deposits on the inner measuring tube wall can be detected and taken into account in further flow determination.

Figure 13:
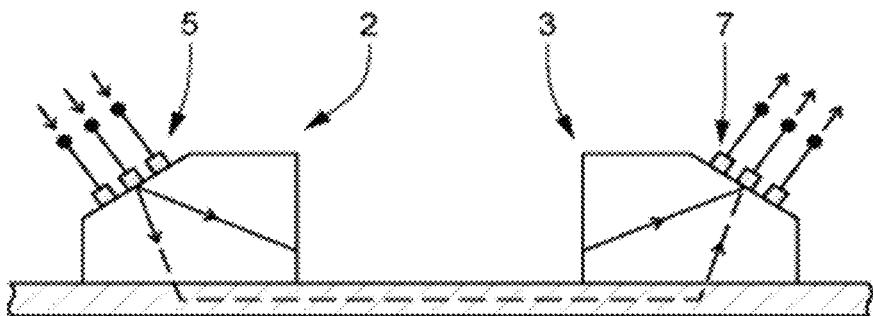
FIG. 13 illustrates a further embodiment of a flowmeter according to the invention.
Figure 13:
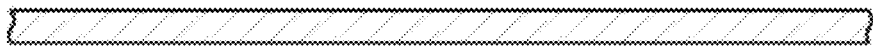

FIG. 13 shows a next embodiment of a flowmeter 1 with a first ultrasonic transducer 2 and a second ultrasonic transducer 3, wherein both ultrasonic transducers 2, 3 have an array 5, 7 of active elements 6 and wherein a part of the measuring signal 8 is aligned by appropriate control of the array 5 operating as an ultrasonic transmitter in such a way that it excites a Lamb wave in the measuring tube wall, which propagates in the direction of the ultrasonic receiver and is captured by the latter. In the illustrated embodiment, the main lobe 12 is emitted such that it excites a Lamb wave in the measuring tube wall.

Alternatively, the array 5 can also be controlled in such a way that a side lobe 13 or a grating lobe 14 excites a Lamb wave in the measuring tube wall.

Figure 14:
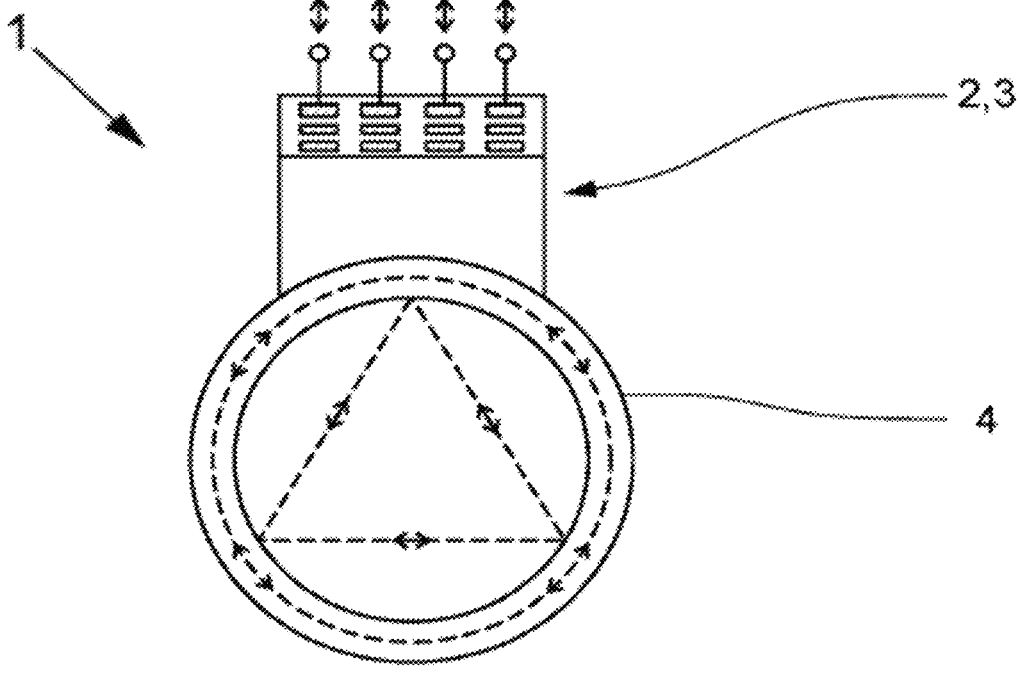
FIG. 14 illustrates a further embodiment of a flowmeter according to the invention.

FIG. 14 shows another embodiment of a flowmeter 1, wherein an array 5, 7 of active elements 6 couples a part of the measuring signal 8 into the measuring tube wall in such a way that the measuring signal 8 propagates along the measuring tube circumference. Another part of the measuring signal 8 propagates inside the measuring tube and hits the ultrasonic receiver after a plurality of reflections.

In principle, the signal path between the first and second ultrasonic transducers can be v-shaped or w-shaped, or it can have no reflection at all on the inner wall of the measuring tube. Likewise, the signal path can be formed as a polygon, in particular as a triangle, quadrilateral or pentagon, when viewed from above the measuring tube.

Figure 15:
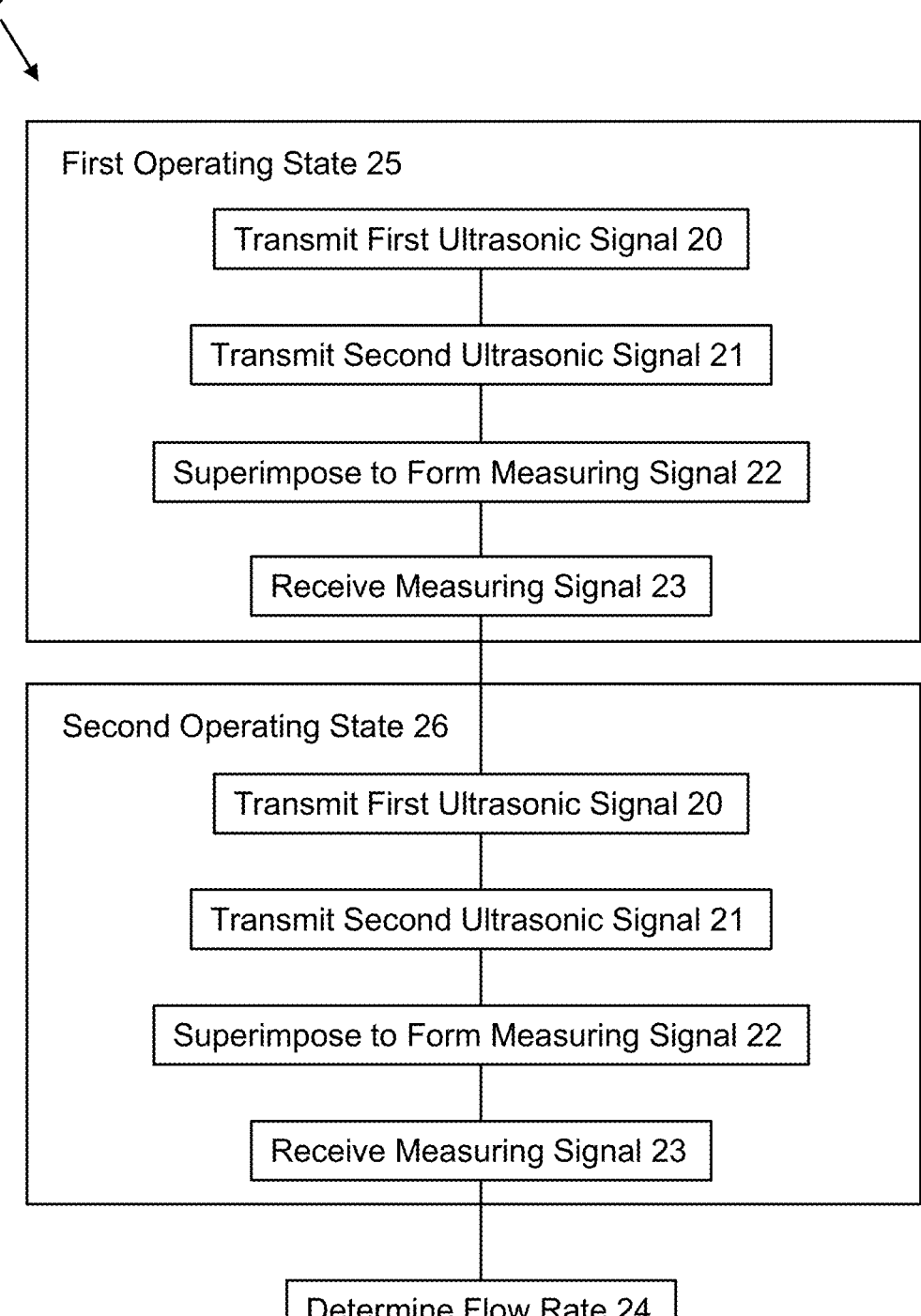
FIG. 15 illustrates a first embodiment of a method according to the invention.

FIG. 15 shows a first embodiment of a method 19 for operating an ultrasonic flowmeter, wherein the ultrasonic flowmeter 1 is designed according to the embodiment shown in FIG. 1.

In a first operating state 25, the first ultrasonic transducer 2 operates as an ultrasonic transmitter and the second ultrasonic transducer 3 operates as an ultrasonic receiver.

In a first method step 20, the first active element 6 of the ultrasonic transmitter transmits a first ultrasonic signal.

Simultaneously or with a time delay, the second active element 6 of the ultrasonic transmitter emits a second ultrasonic signal 21, so that the first ultrasonic signal and the second ultrasonic signal are superimposed 22 to form the measuring signal 8.

The measuring signal 8 has a main lobe 12, two side lobes 13, and two grating lobes 14.

The main lobe 12 is emitted in such a way that it is optimized to hit the ultrasonic receiver.

In a next step 23, the ultrasonic receiver receives the measuring signal 8 and forwards it to the control and evaluation unit.

In a second operating state 26, the second ultrasonic transducer 3 now operates as an ultrasonic transmitter and the first ultrasonic transducer 2 operates as an ultrasonic receiver.

Since, in the illustrated embodiment, the second ultrasonic transducer also has an array 7 of at least two active elements 6, steps 20 to 23 are repeated.

Subsequently, the control and evaluation unit 9 determines 24 the flow rate from the difference in transit time between the measuring signals 8 emitted in and against the direction of flow.

Figure 16:
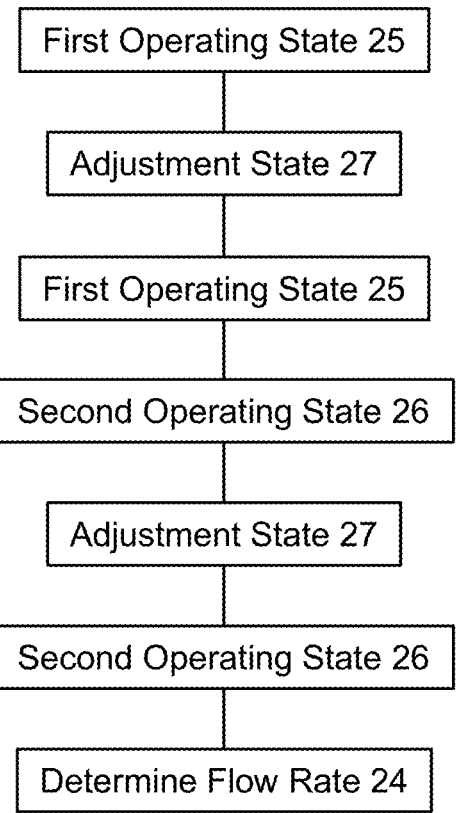
FIG. 16 illustrates another embodiment of a method according to the invention.

In the embodiment of the method 19 shown in FIG. 16, the ultrasonic flowmeter 1 is in an adjustment state 27 after the first operating state 25, in which the control and evaluation unit 9 controls the active elements 6 of the ultrasonic transmitter in such a way that the measuring signal 8, in detail the main lobe 12 is pivoted by an angle of approximately 10° to the current position of the main lobe. During the adjustment state, the control and evaluation unit 9 detects and stores the control parameters for the position in which the signal at the ultrasonic receiver is maximum.

Subsequently, the control and evaluation unit operates the active elements 6 of the first ultrasonic transducer 2 with the control parameters found.

Subsequently, the control of the array 7 of active elements of the second ultrasonic transducer 3 is also readjusted as described above.

Such a readjustment of the control of the arrays 5, 7 can be carried out during operation at regular intervals in order to always ensure an optimal control.

Alternatively or additionally, such readjustment 27 can also be carried out in dependence on the determined flow rate.

Figure 17:
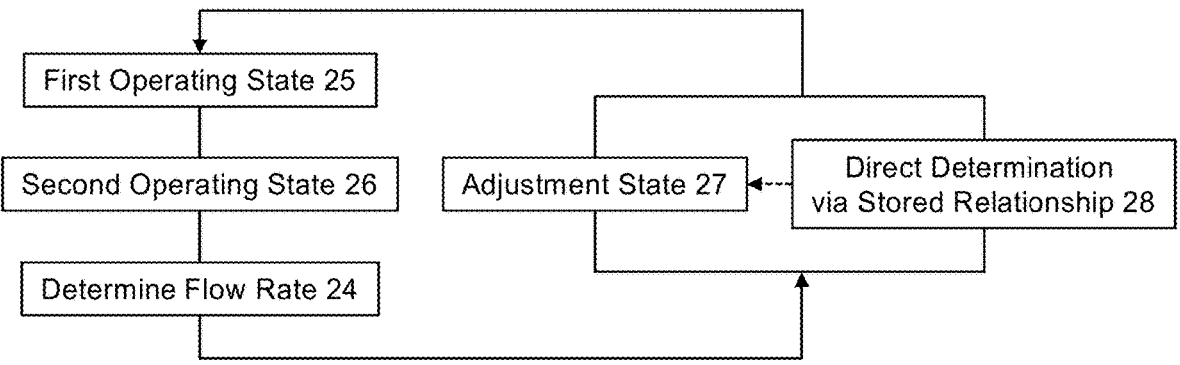
FIG. 17 illustrates another embodiment of a method according to the invention.

FIG. 17 shows that after determining the flow velocity 24, if it is determined that the velocity exceeds an upper limit value or falls below a lower limit value, a readjustment of the control of the arrays 5, 7 is carried out.

Optimal control of the arrays can be determined 27 as previously described by slightly pivoting the main lobe 12 around the current position.

Alternatively or also additionally, a relationship between different flow rates and the control parameters of the arrays 5, 7 can be stored in the control and evaluation unit 9, so that, with the determination of the flow rate, the control of the arrays is directly determined 28.

Accordingly, readjustment can be carried out when the sound velocity changes. For this, the control and evaluation unit 9 constantly or regularly monitors the amplitude of the measuring signal 8 at the ultrasonic receiver, wherein readjustment is carried out in accordance with process steps 27 or 28 if the amplitude falls below a lower limit value.

In a next embodiment of the method 19, in the first operating state 25 and/or the second operating state, a measuring signal is emitted according to steps 20 to 22 of an array 5, 7, wherein the main lobe 12 is emitted in the direction of the ultrasonic receiver and wherein a grating lobe 14 is emitted in the direction of the measuring tube 4 in such a way that further information about the operating state of the ultrasonic flowmeter 1 or about the measurement environment can be obtained by receiving the grating lobe.

Figure 18:
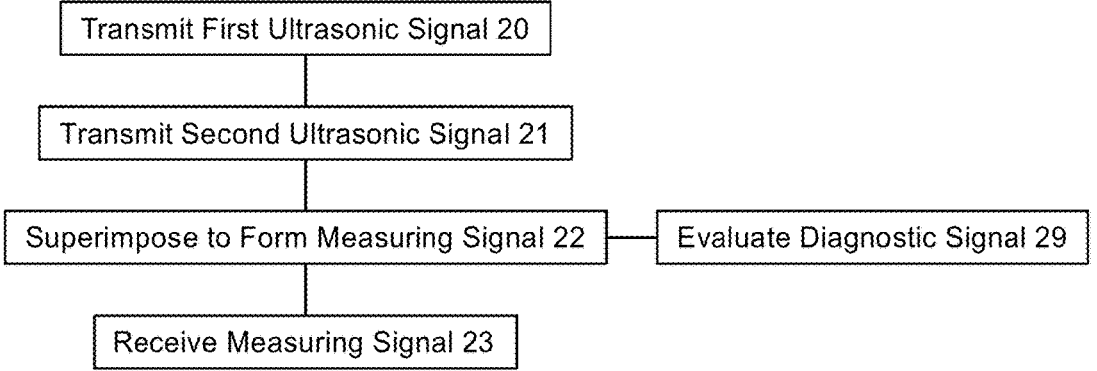
FIG. 18 illustrates another embodiment of a method according to the invention.

In the embodiment shown in FIG. 18, the grating lobe 14 emitted from the first array 5 is emitted perpendicularly to the measuring tube 4, and the reflections from the inner and outer measuring tube walls are again received by the first array 5. From the reflection, the thickness of the measuring tube wall can be determined. According to this embodiment, in this respect the presence of deposits on the measuring tube wall can be detected and taken into account when determining the flow rate.

In another embodiment similar to the one shown in FIG. 18, the grating lobe 14 is coupled into the measuring tube wall in such a way that it excites a Lamb wave, which propagates in the direction of the ultrasonic receiver and is captured by the ultrasonic receiver. In this process, the Lamb wave can either strike the ultrasonic receiver with a time delay with respect to the main lobe 12 or can also be captured by another active element 6, so that the Lamb wave is captured separately from the main lobe. The amplitude and/or the propagation time and/or the spectrum of the Lamb wave is then evaluated.

The invention claimed is:

1. A method for operating an ultrasonic flowmeter, wherein the ultrasonic flowmeter includes at least a first ultrasonic transducer and a second ultrasonic transducer and a control and evaluation unit, wherein the control and evaluation unit is connected to the first ultrasonic transducer and the second ultrasonic transducer, wherein the first ultrasonic transducer and/or the second ultrasonic transducer is/are designed as an ultrasonic transmitter and/or ultrasonic receiver, wherein the first ultrasonic transducer and/or the second ultrasonic transducer is or are designed as a wedge transducer, wherein the first ultrasonic transducer and the second ultrasonic transducer are arranged on a measuring tube in such a way that a signal path is formed between the first and the second ultrasonic transducer, so that a measuring signal emitted by the ultrasonic transmitter runs via the signal path to the ultrasonic receiver, wherein the first ultrasonic transducer has a first array of at least two active elements and/or the second ultrasonic transducer has a second array of at least two active elements, the method comprising:

the control and evaluation unit separately controlling at least two active elements of the array arranged on the first ultrasonic transducer and/or at least two active elements of the array arranged on the second ultrasonic transducer;

the control and evaluation unit controlling the array functioning as an ultrasonic transmitter in such a way that a radiation angle of the measuring signal is varied at least at times, and/or varying a reception characteristic of the array functioning as an ultrasonic receiver at least at times;

in order to determine the flow rate during measurement, the measuring signal impinging on the ultrasonic receiver in an optimized manner and/or the ultrasonic receiver receiving the measuring signal in an optimized manner with respect to the radiation angle;

wherein for installation of the ultrasonic transducers on the measuring tube, the ultrasonic transmitter emits a measuring signal;

wherein by pivoting the reception characteristic of the ultrasonic receiver, the pivoting angle at which the ultrasonic receiver optimally receives the measuring signal, is determined; and wherein the control and evaluation unit, starting from the pivoting angle and taking into account a geometry of the signal path, determines a position for the ultrasonic transmitter and/or the ultrasonic receiver at which the ultrasonic transmitter array transmits the measuring signal in a non-pivoted manner and at which the ultrasonic receiver array receives the measuring signal in a non-pivoted manner.

2. The method according to claim 1, wherein at least the ultrasonic transducer operating as an ultrasonic transmitter in an operating state has an array of at least two active elements, wherein the at least two active elements of the ultrasonic transmitter are separately controllable by the control and evaluation unit;

wherein, in a first operating state, the first active element of the ultrasonic transmitter emits a first ultrasonic signal;

wherein the second active element of the ultrasonic transmitter emits a second ultrasonic signal; and wherein the first ultrasonic signal and the second ultrasonic signal are superimposed to form the measuring signal.

3. The method according to claim 2, wherein the measuring signal has at least one main lobe and at least two side lobes and/or at least two grid grating lobes due to a superposition of at least the first ultrasonic signal and the second ultrasonic signal.

4. The method according to claim 3, wherein the first ultrasonic signal and the second ultrasonic signal are emitted at least at times with a time delay and/or with different amplitude and/or with different phase, whereby the radiation angle of the measuring signal of the main lobe of the measuring signal is changed.

5. The method according to claim 2, wherein the measuring signal has at least one main lobe and at least two side lobes and/or two grid grating lobes;

wherein at least at times the at least one main lobe or at least one side lobe or at least one grating lobe is aligned with the measuring tube in such a way, that the main lobe or the side lobe or the grating lobe is reflected at the measuring tube and the reflection is received again by the array of active elements initially operating as an ultrasonic transmitter; and wherein the control and evaluation unit determines from the reflection of the main lobe or the side lobe or the grating lobe at least one item of information about an operating state and/or a measuring environment.

6. The method according to claim 5, wherein the at least one main lobe or the at least one side lobe or the at least one grating lobe is aligned at least temporarily with the measuring tube in such a way that the at least one main lobe or the at least one side lobe or the at least one grating lobe excites a Lamb wave which propagates along a measuring tube wall in a direction of the ultrasonic receiver and which is detected by the ultrasonic receiver, wherein the amplitude and/or a propagation time and/or a spectrum of the Lamb wave is evaluated.

7. The method according to claim 1, wherein, at least at times, the signals measured at the individual active elements of the array functioning as an ultrasonic receiver are superimposed on one another in a time-delayed and/or phase-shifted manner and/or weighted with different amplitude, whereby the reception characteristic of the ultrasonic receiver is pivoted.

8. The method according to claim 1, wherein the control and evaluation unit monitors an amplitude of the measuring signal detected by the ultrasonic receiver, and the radiation angle of the measuring signal and/or the reception characteristic of the ultrasonic receiver is changed if the amplitude falls below a threshold value.

9. The method according to claim 8, wherein the control and evaluation unit varies the radiation angle of the measuring signal and/or the reception characteristic of the ultrasonic receiver at regular or irregular intervals in order to maximize the measuring signal at the ultrasonic receiver;

wherein, during the variation, the control and evaluation unit detects a maximum of the amplitude at the ultrasonic receiver as well as the corresponding control parameters of the active elements thereto; and wherein the control and evaluation unit subsequently controls the array of at least two active elements of the ultrasonic transmitter and/or of the ultrasonic receiver in accordance with the determined control parameters.

10. The method according to claim 9, wherein the control and evaluation unit adjusts the radiation angle of the measuring signal emitted by the ultrasonic transmitter and/or the reception characteristic of the ultrasonic receiver depending on a measured flow velocity of the medium and/or depending on a sonic velocity of the medium, in such a way that the measuring signal is maximized at the ultrasonic receiver.

11. The method according to claim 1, wherein the control and evaluation unit has a memory unit; and wherein a relationship between a radiation angle of a measuring signal or control parameters for the array of active elements of the ultrasonic transmitter and/or the ultrasonic receiver and different media and/or different flow rates and/or different sound velocities is stored in the memory unit, so that when the flow rate changes and/or when a medium changes, the control and evaluation unit automatically adjusts the radiation angle of the measuring signal and/or the control parameters for the array of active elements and/or the reception characteristic of the ultrasonic receiver in accordance with the stored relationship.

* * * * *